(12) United States Patent
Ghannam

(10) Patent No.: US 11,700,119 B2
(45) Date of Patent: Jul. 11, 2023

(54) DISTRIBUTED LEDGER SYSTEMS FOR MODULAR VEHICLES

(71) Applicant: Ford Global Technologies, LLC, Dearborn, MI (US)

(72) Inventor: Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 17/089,807

(22) Filed: Nov. 5, 2020

(65) Prior Publication Data
US 2022/0141017 A1    May 5, 2022

(51) Int. Cl.
| | | |
|---|---|---|
| H04L 9/32 | (2006.01) | |
| G06Q 20/40 | (2012.01) | |
| G07C 5/00 | (2006.01) | |
| H04L 9/40 | (2022.01) | |
| H04W 4/44 | (2018.01) | |
| H04W 4/46 | (2018.01) | |
| G07C 5/08 | (2006.01) | |
| H04L 9/00 | (2022.01) | |

(52) U.S. Cl.
CPC ............. *H04L 9/32* (2013.01); *G06Q 20/401* (2013.01); *G07C 5/006* (2013.01); *G07C 5/008* (2013.01); *G07C 5/08* (2013.01); *H04L 63/0428* (2013.01); *H04W 4/44* (2018.02); *H04W 4/46* (2018.02); *H04L 9/50* (2022.05); *H04L 2209/84* (2013.01)

(58) Field of Classification Search
USPC ........................................................ 701/29.1
See application file for complete search history.

(56) References Cited

U.S. PATENT DOCUMENTS

| | | | |
|---|---|---|---|
| 6,059,058 A * | 5/2000 | Dower | B60L 50/52 |
| | | | 180/65.265 |
| 10,545,509 B1 * | 1/2020 | Jessen | B62D 63/025 |
| 2018/0091596 A1 | 3/2018 | Alvarez et al. | |
| 2019/0238338 A1 | 8/2019 | O'Brien et al. | |
| 2019/0279440 A1 * | 9/2019 | Ricci | H04W 4/48 |
| 2020/0369140 A1 * | 11/2020 | McCarron | B60G 7/001 |
| 2022/0155756 A1 * | 5/2022 | Ghannam | G05B 19/4183 |

OTHER PUBLICATIONS

"Hyperledger-fabricdocs Documentation", Release Master, Jun. 5, 2018, 301 pages.

* cited by examiner

*Primary Examiner* — Tyler D Paige
(74) *Attorney, Agent, or Firm* — Brandon Hicks; Eversheds Sutherland (US) LLP

(57) ABSTRACT

The disclosure is directed to, among other things, distributed ledger systems for modular vehicles. The disclosure may involve receiving, at a first ledger associated with a first node, information regarding an interaction between the first node and a second node. The same transaction information may also be received at a second ledger associated with the second node, as well as ledgers associated with any other number of nodes. The first node, second node, and any other number of nodes may be modular vehicle components. Additionally, the first ledger, second ledger, and any other number of ledgers include a set of the same information. The first node, second node, and third node may be nodes on a distributed ledger network.

17 Claims, 5 Drawing Sheets

DISTRIBUTED LEDGER SYSTEMS FOR MODULAR VEHICLES

BACKGROUND

The use of modular vehicles formed by combinations of modular vehicle components provides several benefits. In particular, such modular vehicles may be especially beneficial in the context of vehicle fleets, as a fleet owner may optimize costs by owning a smaller number of base components (e.g., modular components including the wheels and suspension, among other components) and a number of interchangeable top components (e.g., modular components including the vehicle's interior and exterior, among other components) to combine with the base components. Additionally, the top components could be rented from third parties. However, given the large number of modular components involved in such a fleet, difficulties may arise in the tracking of such components, such as their current location, combinations with other components, and valid and invalid combinations that may be made between such components, for example.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

DETAILED DESCRIPTION

Overview

Figure 1:
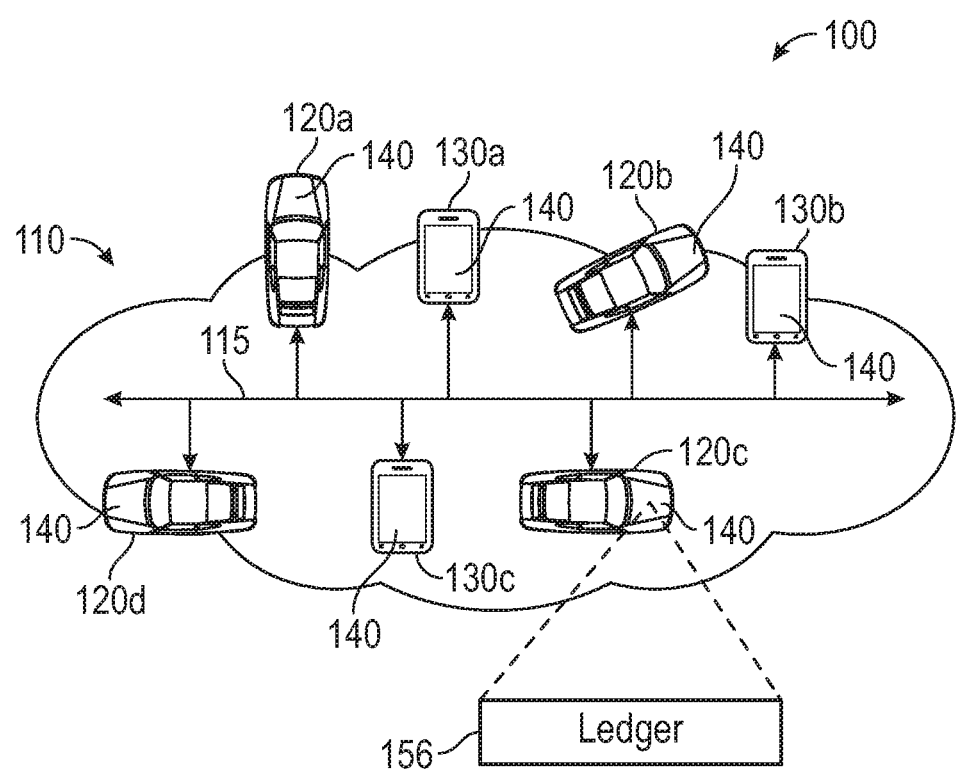
FIG. 1 illustrates an example of an operational environment to supply updated vehicular profile packages, in accordance with one or more embodiments of this disclosure.

The disclosure is directed to, among other things, distributed ledger systems for modular vehicles. In some embodiments, the systems and methods disclosed herein relate to the use of a distributed ledger system for a fleet or fleets of modular vehicles that may include combinations of different modular vehicle components. The distributed ledger system may include, for example, a blockchain network. Each of the modular vehicle components may include individual components of a modular vehicle that, when combined, may form a full modular vehicle. For example, a modular vehicle component may include a base, a top portion, and/or an interface. The base of the modular vehicle may include lower structural elements of a vehicle, such as wheels, battery (for example, in the case of an electric or hybrid powertrain vehicle), an electronic drive system, and a suspension system, among various other components. The top portion of the modular vehicle may include a body structure including exterior and/or interior components of a vehicle, such as seats, mirrors, windows, headlights, taillights doors, a trunk, and a hood, among various other elements. The interface of the modular vehicle may include a modular component that may allow for the combination of the top portion and the base. For example, the interface may contain mechanical and/or electrical connections for combining elements of the top portion of the modular vehicle with elements on the base of the modular vehicle. As one particular non-limiting example, the interface may include electrical connections to allow power to be drawn from a battery on the base and fed to systems on the interior of the top portion (for example, a head unit). These may merely be examples of types of modular vehicle components, and any other number of types of modular vehicle components may similarly exist.

Each of the modular vehicle components may represent a node in the distributed ledger system. That is, each of the modular vehicle components may be associated with its own distributed ledger. These ledgers at each of the nodes in the distributed ledger system may include the same or similar information, such that all nodes may have access to all of the same information about any of the other nodes in the network. In this regard, the distributed ledger may also be decentralized, such that the nodes may not rely on a single, centralized data storage element for storing and retrieving information about the nodes. Additionally, other types of nodes may exist on the distributed ledger system other than the modular vehicle components. For example, the modular vehicle components may be part of a fleet of modular vehicles, and a fleet manager device may also exist as a node on the distributed ledger network. This may allow the fleet manager device to include the same decentralized ledger, and thus the fleet manager may be apprised of the same information about all of the other nodes in the network.

The distributed ledger system may be used to track information about each of the nodes (for example, which nodes exist in the modular vehicle fleet, how many of each type of modular vehicle component exists, the capabilities of each of the modular vehicle components, etc.). The distributed ledger system may also be used to track any changes to any of the nodes and/or any interactions between any of the nodes. An interaction may involve, for example, a combination of various modular vehicle components that may take place. For example, a first interaction may include a particular base being combined with a particular interface and a particular top portion. This combination may be stored as a transaction and distributed to all ledgers associated with the nodes on the distributed ledger system. Additional information may also be provided, such as whether the combination is valid or invalid, and/or even if the combination is valid, if there are any performance considerations that arise in a modular vehicle including these modular vehicle components. Thus, the ledgers may include information about which modular vehicle components are currently being used in combination with one another to provide vehicle fleet services, and which modular vehicle components are currently available for combination with other modular vehicle components. All of this information may be stored as a running history of information, such that information may never be deleted or altered. For example, this information may be stored as individual transactions on a blockchain. Furthermore, the aforementioned types of information that may store to the ledgers may simply be an exemplification, and any other relevant information may also be added to the ledgers.

This distributed ledger network of modular vehicle components may be advantageous for several reasons. First, the use of the distributed ledger to track transactions within the modular vehicle fleet may serve to prevent invalid or undesirable transactions from occurring. An invalid or undesirable transaction may be a combination of one or more modular vehicle components that are incompatible with one another. For example, certain top portions, interfaces, and/or bases may not be mechanically, electrically, or otherwise compatible with one another. Additionally, even if certain top portions, interfaces, and bases may physically and electrically be capable of a combination to form a modular vehicle, a particular combination may not be optimal in terms of performance. Information about incompatibilities between modular vehicle components may be pre-stored in the distributed ledger such that the information may be available before the particular invalid combination is attempted. Alternatively, a combination may be attempted, and based on a subsequent determination that the combination is invalid, the ledger may be updated to include this invalid combination as a new transaction on the ledger to prevent such a combination from being attempted in the future.

Second, the use of the distributed ledger to track transactions within the modular vehicle fleet may serve to track valid or approved transactions. While some combinations of modular vehicle components may be invalid or undesirable, other combinations may be valid and/or approved. It may be advantageous to keep records of such valid transactions as a reference point for performing combinations of modular vehicle components in the future. Additionally, nodes within the distributed ledger system may be used to authenticate transactions, such that the transactions are not finalized and added to the ledger until they are authenticated by one or more of the nodes.

Third, the use of the distributed ledger system may also be beneficial for security and/or troubleshooting purposes. A fleet of modular vehicle components may comprise any number of components, which may be an exceedingly large number of components depending on the size of the fleet. It may be difficult for a fleet manager to keep track of all of the components of the fleet if modular components are constantly being mixed and matched with other components and transported to different locations as the modular vehicles perform services provided by the fleet. Thus, by tracking actions that take place regarding the modular vehicle components, a fleet manager may be able to track the location and status of any of the modular vehicle components in the fleet at any time using the distributed ledger. This may, for example, assist in theft prevention of a modular component, as the distributed ledger would include an entry indicating that a particular modular component was removed from a modular vehicle. The use of the distributed ledger may also be beneficial for general tracking of the usage of the modular vehicle components included within a modular vehicle fleet and/or other general troubleshooting purposes because the ledgers include a running history of information regarding nodes and their interactions.

The use of the distributed ledger over a centralized fleet manager server may also have a number of advantages. For example, the ledger may be immutable, which may mean that if a transaction is written in error, it can't be edited or deleted from the ledger. Instead, a new transaction with the correct information may simply be added as a new transaction. In this way the ledger may create a life history of that asset back to the beginning of the system. This may enable improved traceability. The ledger may also be sharable and distributed, which may mean that identical copies of the ledger may be held by different members of a business network. In effect, each network member may be looking at the same system of record. This may enable greater transparency. The ledger may also be permissioned, which may mean that only known parties have access to copies of the ledger and known persons have permission to view the data on the ledgers. These identity management services may be combined with strong measures for data security (e.g., public/private key infrastructure) and data privacy (e.g., all transaction data ion the distributed ledger network may be encrypted), and the ledger may become a trusted place to hold strategically valuable data.

These above-described advantages are merely examples and not intended to be limiting. Any number of additional benefits may also arise from such a modular vehicle distributed ledger system.

Illustrative Embodiments

With reference to the drawings, FIG. 1 is a schematic block diagram of an example of an operational environment 100, in accordance with one or more embodiments of this disclosure. The exemplified operational environment 100 may include a network 110 of nodes 140. In some instances, the nodes 140 may include modular vehicle components, such as top portions, interfaces, bases, and/or any other modular vehicle component, as well as any other type of node (for simplicity, nodes may be interchangeably referred to as modular vehicle components herein, however any other type of node may be equally applicable).

As is illustrated in FIG. 1, the network 110 can include a first top portion 120a, a second top portion 120b, a third top portion 120c, a fourth top portion 120d, or any other number of top portion. The network 110 also can include a first base 130a, a second base 130b, a third base 130c, or any number of other bases. Additionally, the network may include a fleet manager node 135. The network may also include any number of other types of modular vehicle components (not depicted in the figure), such as interfaces. The network 110 may also include communication media 115. The nodes 140 (for example, top portions 120a, 120b, or 120c and/or bases 130a, 130b, or 130c) may include at least any of the elements described with respect to FIG. 5 below (for example, one or more processor(s), memory, I/O interface(s), network interface(s), mass storage, etc.). The nodes 140 may also include a ledger 156, which may be a distributed, decentralized ledger that is located at each of the nodes 140.

Figure 2:
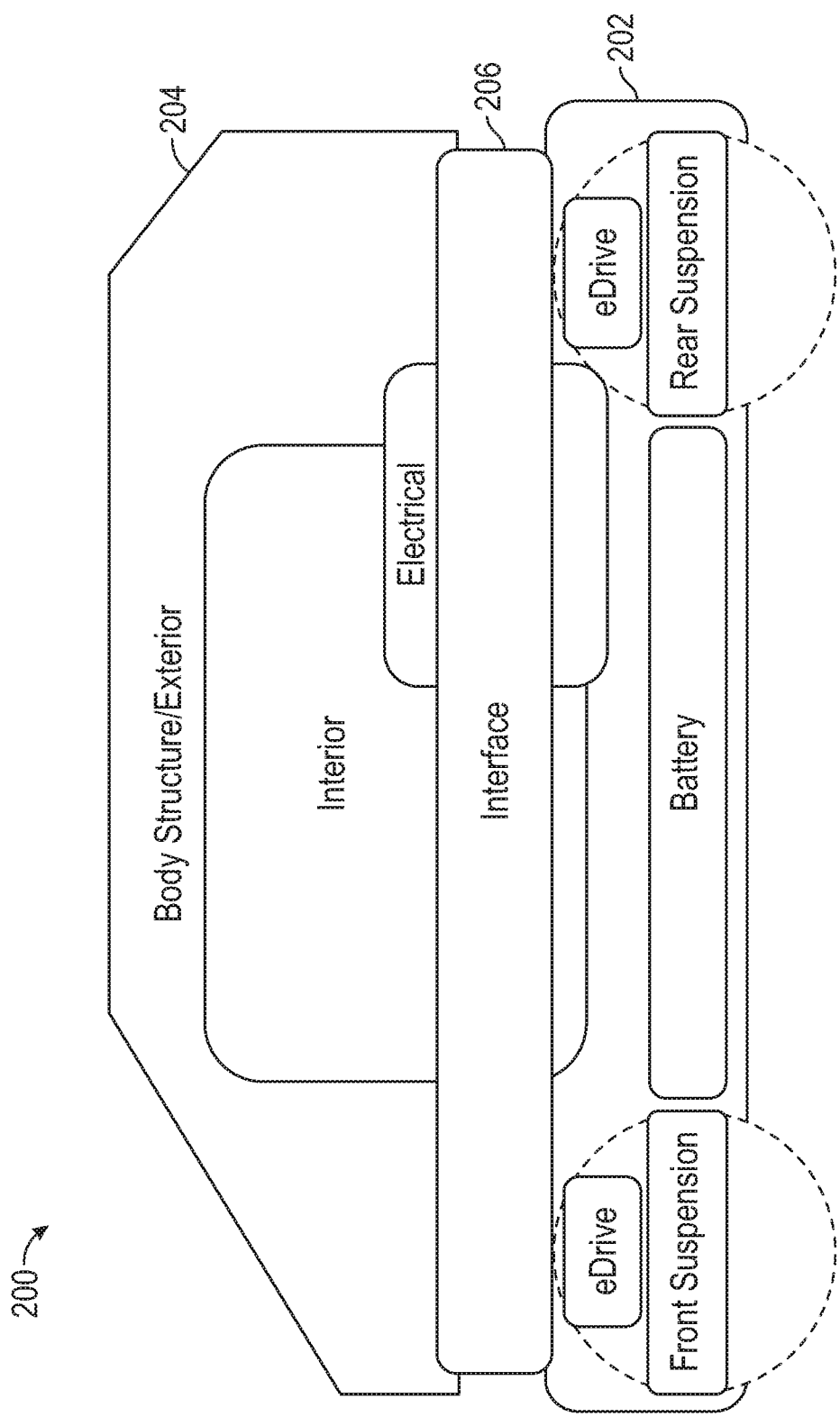
FIG. 2 illustrates an example of a modular vehicle, in accordance with one or more embodiments of this disclosure.

The modular vehicle components (for example, top portions 120a, 120b, or 120c and/or bases 130a, 130b, or 130c) may be further depicted as a combination in the form of a modular vehicle 200 in more detail with respect to FIG. 2. The modular vehicle 200 may include a base 202, a top portion 204, and/or an interface 206. Each of these individual modular vehicle components may represent a node in the distributed ledger network. For example, the base 202 may be any of the bases 130a, 130b, or 130c and the top portion may be any of the top portions 120a, 120b, or 120c. Although the interface 206 is not depicted as a node 140 in the network 100 with respect to FIG. 1, the interface 206 may also be included as a node. Additionally, any number of other modular vehicle components may exist, such that the modular vehicle components may not be limited to only the base 202, top portion 204, and/or interface 206.

The fleet manager node 135 may be a device associated with a user responsible for managing the fleet of modular vehicle components. The fleet manager node 135 may also have a ledger similar to the other nodes 140 on the network 110, such that the user may be able to access information about the various modular vehicle components in the network 110, including, for example, their current status, location, and transaction history, among other information.

The communication media 115 may permit exchanging data and/or signaling wirelessly between nodes in the network 110. That is, the communication media 115 may permit exchanging data and/or signaling between vehicles, between mobile devices, and/or between vehicles and mobile devices in the network 110. The communication media 115 can include communication links, base stations, access points, and/or multiple network devices (such as server devices, gateway devices, and the like).

Finally, the ledger 156 may be a decentralized and distributed information source that may be continuously updated, distributed and/or stored at each of the nodes 140. Some or all nodes of the one or more nodes 140 may also have access to and/or have stored the same or a similar ledger 156. This may allow the nodes to be apprised of the same ledger information at any given time. In one particular implementation, the ledger 156 may include information in the form of a blockchain. In such an implementation, a blockchain can include one or many blocks of data. Updating the ledger 156 can thus include, for example, adding a block of data corresponding to the to the ledger record.

Figure 3:
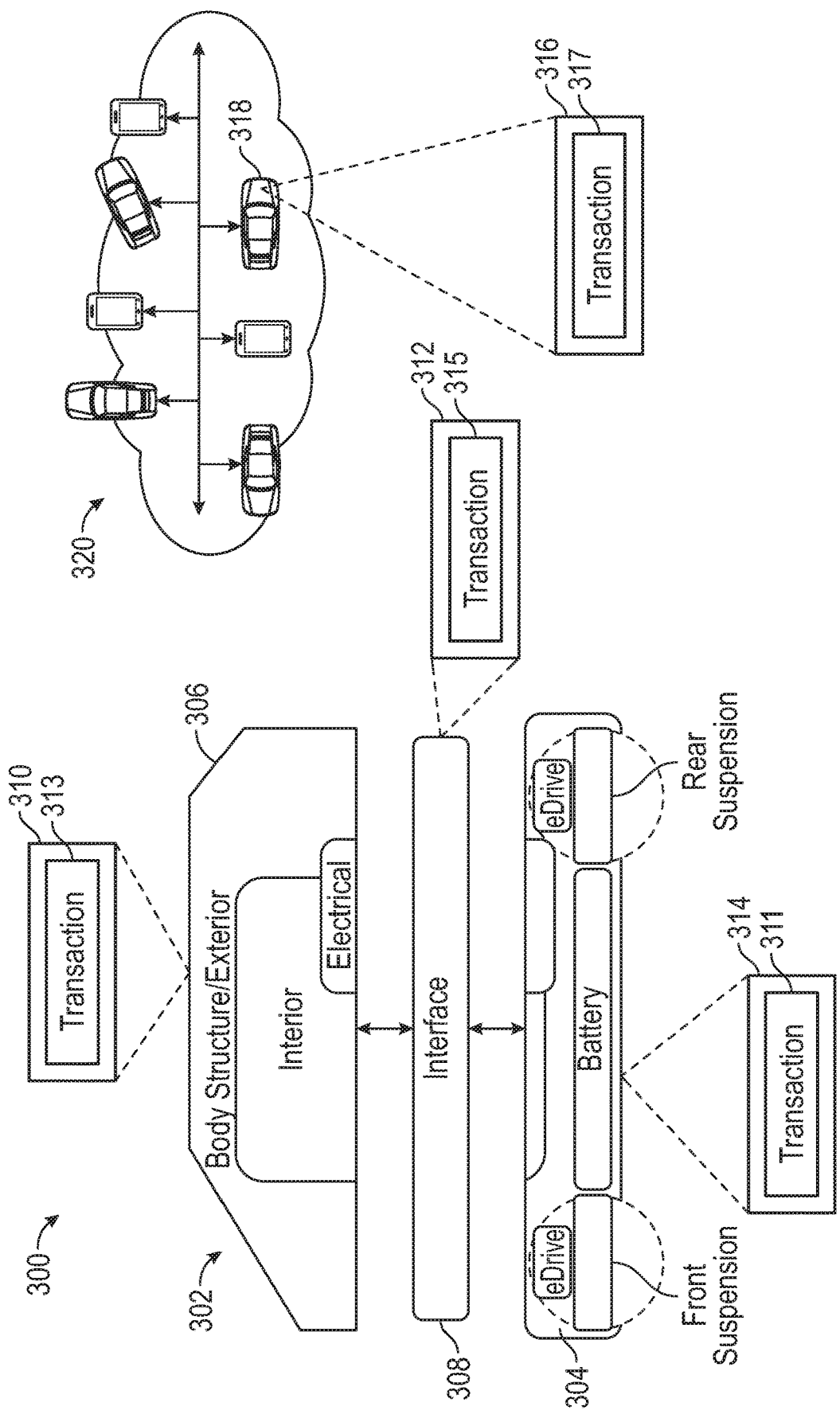
FIG. 3 illustrates an example use case of updating a decentralized ledger based on an interaction between modular vehicle components, in accordance with one or more embodiments of this disclosure.

FIG. 3 may provide an illustration of an example use case 300 of an updating process for the distributed ledger system (e.g., network 110 of nodes 140). The use case 300 may involve a process for updating the distributed ledger system with a new transaction, which may be based on an interaction 302 between modular vehicle components as described herein. For example, the interaction 302 may take place between a base 304, a top portion 306, and an interface 308, and the interaction 302 may include a combining of these three modular vehicle components to form a full modular vehicle. The use case 300 may also involve any other types of information associated with the modular vehicle components, such as timestamps of their current location, names of fleet operators who works with the specific components, or any other type of information. Based on the interaction 302, or other types of new information regarding the modular vehicle components, a new transaction may be sent to the ledgers of the distributed ledger network. For example, as depicted in FIG. 3, the transaction may be sent to the ledger 310 associated with the top portion 306, to ledger 312 associated with the interface 308, and to ledger 314 associated with the base 304. The transaction may be represented as transactions 311, 313, and 315 in the respective ledgers, and each of transactions 311, 313, and 315 may be the same or similar. Additionally, the transaction may also be sent to the remaining nodes in the distributed ledger network 320, which may be the same as network 110 described with respect to FIG. 1 above. For example, the transaction may be updated on ledger 316 associated with node 318 as transaction 317, which may be the same as transactions 311, 313, and 315. This way, all of the nodes in the distributed ledger network 320 may be apprised of the transaction and the distributed ledger may keep a running history of any transactions taking place in the fleet as well as any new information associated with modular vehicle components in the fleet. Furthermore, if a node 318 identifies that interaction 302 involves an incorrect combination of modules, the node 318 may flag the transaction. If none of the nodes authorize the transaction, then in some cases the transaction may be nullified and not performed.

Figure 4:
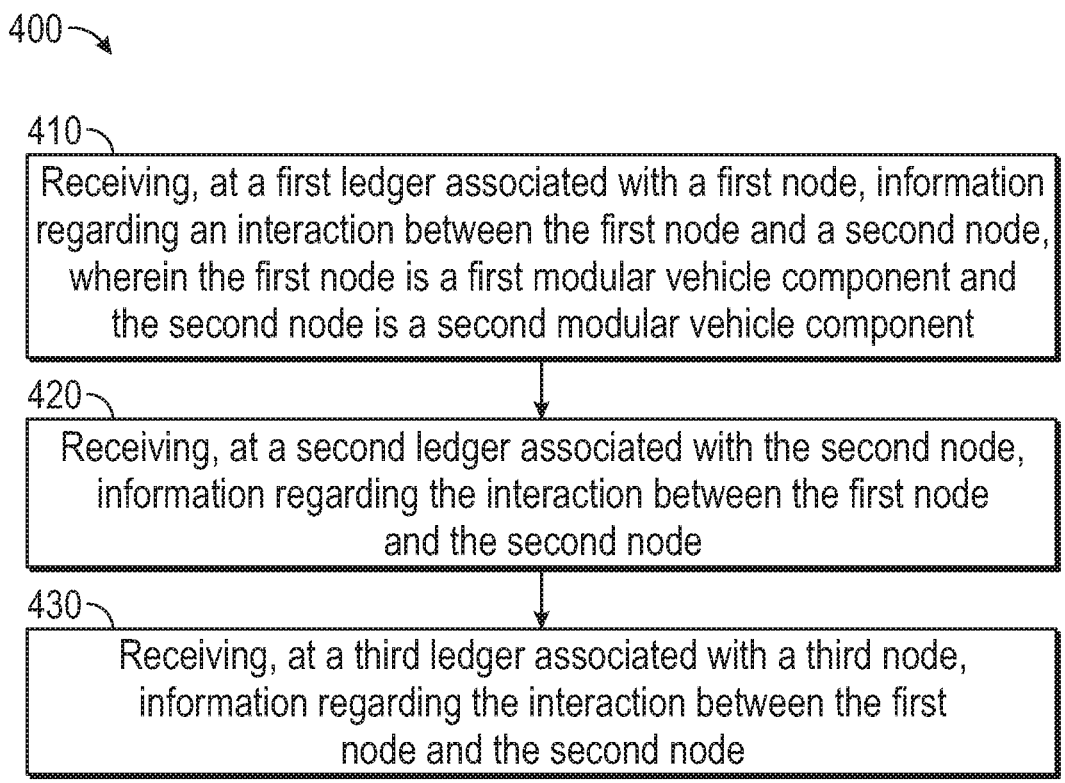
FIG. 4 illustrates an example method, in accordance with one or more embodiments of this disclosure.

Examples of techniques that emerge from the principles of this disclosure and that can be implemented in accordance with this disclosure can be better appreciated with reference to FIG. 4. For purposes of simplicity of explanation, the exemplified methods in FIG. 4 (and other techniques disclosed herein) are presented and described as a series of operations. It is noted, however, that the exemplified method and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other techniques disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 4 is a flowchart of an example of a method, in accordance with one or more embodiments of this disclosure. A computing device (e.g., computing device 500) included in a server can implement, entirely or partially, the example method 400. The method of FIG. 4 may similarly be implemented by any other element of the operational environment 100, such as a node 140.

At block 410, the computing device included in the computing apparatus can perform operations including receiving, at a first ledger associated with a first node, information regarding an interaction between the first node and a second node, wherein the first node is a first modular vehicle component and the second node is a second modular vehicle component. As described above, the first node and second node may represent modular vehicle components of a modular vehicle fleet. Each of the modular vehicle components may be associated with its own distributed ledger including the same or similar information as all of the other ledgers in the distributed ledger network. That is, each node in the distributed ledger network may include information about all of the transactions and other information associated with the distributed ledger network. Also as described above, an interaction between modular vehicle components may involve combining modular vehicle components to form a full modular vehicle. The specific combinations of modular vehicle components may be recorded, as well as information associated with such combinations, such as whether the combinations are valid or invalid, the operators that performed the combination, a timestamp associated with the combination, or any other relevant information.

At block 420, the computing device can perform operations including receiving, at a second ledger associated with the second node, information regarding the interaction between the first node and the second node. That is, the first ledger of the first node associated with the transaction may receive the transaction, and the second ledger of the second node associated with the transaction may also receive the transaction.

At block 430, the computing device can perform operations including receiving, at a third ledger associated with a third node, information regarding the interaction between the first node and the second node. That is, the transaction may be provided to some or all of the other nodes on the distributed ledger network, even beyond the nodes involved in the transaction. In some instances, the third node does not have to be a modular vehicle component, but may also be another type of node, such as a fleet manager device. Additionally, the first ledger, second ledger, and third ledger include a set of the same information, and the first node, second node, and third node are nodes on a distributed ledger network.

Figure 5:
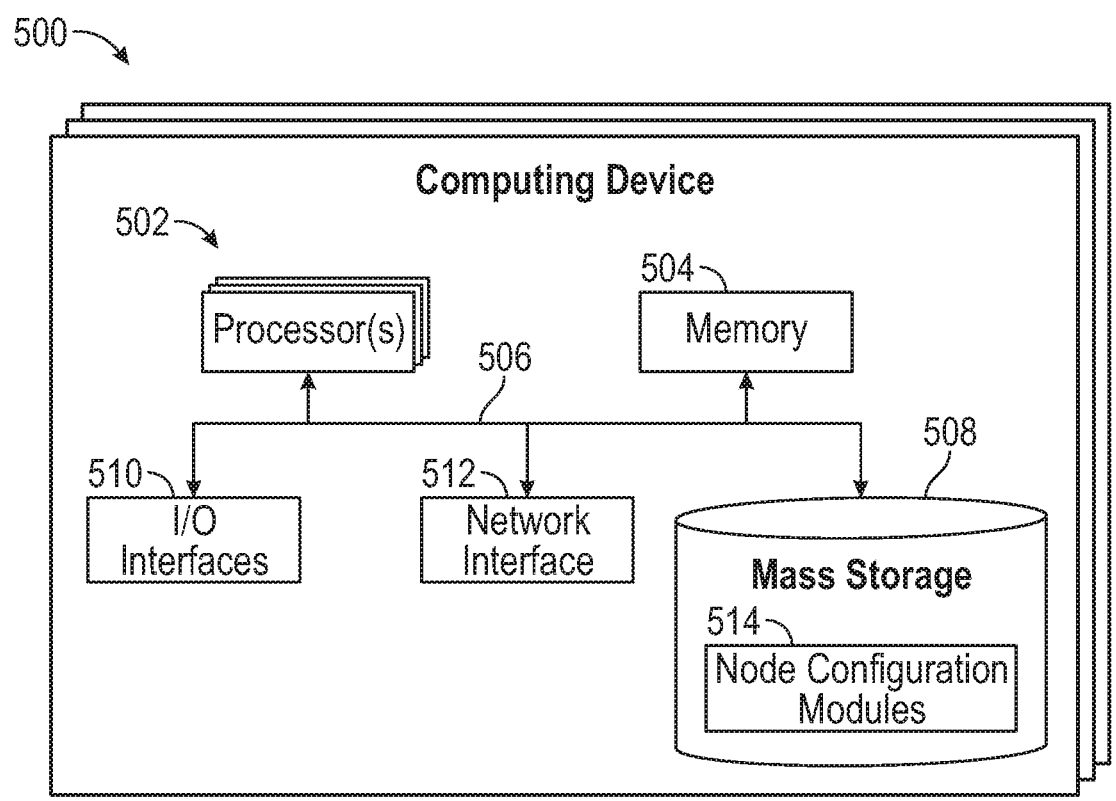
FIG. 5 illustrates an example of a computing environment, in accordance with one or more embodiments of this disclosure.

FIG. 5 illustrates an example computing device 500, in accordance with one or more embodiments of this disclosure. The computing 500 device may be representative of any number of elements described herein, such as any of the nodes 140 and/or any of the servers (e.g., server 142a and/or 142b). The computing device 500 may include at least one processor 502 that executes instructions that are stored in one or more memory devices (referred to as memory 504). The instructions can be, for instance, instructions for implementing functionality described as being carried out by one or more modules and systems disclosed above or instructions for implementing one or more of the methods disclosed above. The processor(s) 502 can be embodied in, for example, a CPU, multiple CPUs, a GPU, multiple GPUs, a TPU, multiple TPUs, a multi-core processor, a combination thereof, and the like. In some embodiments, the processor(s) 502 can be arranged in a single processing device. In other embodiments, the processor(s) 502 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 502 can access the memory 504 by means of a communication architecture 506 (e.g., a system bus). The communication architecture 506 may be suitable for the particular arrangement (localized or distributed) and type of the processor(s) 502. In some embodiments, the communication architecture 506 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 504 also can retain data, such as any ledger 156 information, among other data.

Each computing device 500 also can include mass storage 508 that is accessible by the processor(s) 502 by means of the communication architecture 506. The mass storage 508 can include machine-accessible instructions (e.g., computer-readable instructions and/or computer-executable instructions). In some embodiments, the machine-accessible instructions may be encoded in the mass storage 508 and can be arranged in components that can be built (e.g., linked and compiled) and retained in computer-executable form in the mass storage 508 or in one or more other machine-accessible non-transitory storage media included in the computing device 500. Such components can embody, or can constitute, one or many of the various modules disclosed herein. Such modules are illustrated as node configuration modules 514.

Execution of the node configuration modules 514, individually or in combination, by at least one of the processor(s) 502, can cause the computing device 500 to perform any of the operations described herein (for example, the operations described with respect to FIG. 4, as well as any other operations).

Each computing device 500 also can include one or more input/output interface devices 510 (referred to as I/O interface 510) that can permit or otherwise facilitate external devices to communicate with the computing device 500. For instance, the I/O interface 510 may be used to receive and send data and/or instructions from and to an external computing device. The computing device 500 also includes one or more network interface devices 512 (referred to as network interface(s) 512) that can permit or otherwise facilitate functionally coupling the computing device 500 with one or more external devices. Functionally coupling the computing device 500 to an external device can include establishing a wireline connection or a wireless connection between the computing device 500 and the external device. The network interface devices 512 can include one or many antennas and a communication processing device that can permit wireless communication between a vehicle and either another vehicle or an external device. The other vehicle can be, for example, one of the vehicles included in the network 110 or an out-of-network vehicle. The external device can be, for example, one of the mobile devices included in the network 110. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system, comprising:
a processor; and
a memory storing computer-executable instructions, that, when executed by the processor, cause the processor to:
generate, by a modular vehicle, information regarding an interaction between at least two of a first node, a second node, and a third node, wherein the first node is a first modular vehicle component, the second node is a second modular vehicle component, and the third node is a third modular vehicle component;
receive, at a first ledger associated with the first node, the information regarding the interaction between the at least two of the first node, the second node, and the third node;
receive, at a second ledger associated with the second node, the information regarding the interaction between the at least two of the first node, the second node, and the third node;
receive, at a third ledger associated with the third node, the information regarding the interaction between the at least two of the first node, the second node, and the third node; and
receive, at a fourth ledger associated with a fourth node, the information regarding the interaction between the at least two of the first node, the second node, and the third node,
wherein the first modular vehicle component is a top portion of the modular vehicle, the second modular vehicle component is a base of the modular vehicle, the third modular vehicle component is an interface of the modular vehicle configured to mechanically and/or electrically connect the top portion of the modular vehicle with the base of the modular vehicle, and the fourth node is a fleet manager device for a fleet of modular vehicles,
wherein the first ledger, the second ledger, the third ledger, and the fourth ledger include a set of the same information, and
wherein the first node, the second node, the third node, and the fourth node are nodes on a distributed ledger network.

2. The system of claim 1, wherein the distributed ledger network is a blockchain network.

3. The system of claim 1, wherein the interaction between the at least two of the first node, the second node, and the third node includes combining the first modular vehicle component with the second modular vehicle component via the third modular vehicle component to form a full modular vehicle.

4. The system of claim 1, wherein the computer-executable instructions further comprise:
receive, at a fifth ledger associated with a fifth node of the distributed ledger network, information regarding a failed interaction between the fifth node and a sixth node of the distributed ledger network, wherein the fifth node is a fourth modular vehicle component and the sixth node is a fifth modular vehicle component, and wherein the failed interaction includes an incompatibility between the fourth modular vehicle component and the fifth modular vehicle component.

5. The system of claim 1, wherein the computer-executable instructions further comprise:
receive a request to form a full modular vehicle;
determine, using at least one of: the first ledger, the second, ledger, the third ledger, or the fourth ledger, that the first modular vehicle component, the second modular vehicle component, and the third modular vehicle component are compatible with each other;
provide, based on the determination that the first modular vehicle component, the second modular vehicle component, and the third modular vehicle component are compatible with each other, an instruction to combine the first modular vehicle component and the second modular vehicle component via the third modular vehicle component to form the full modular vehicle; and
store an entry on the first ledger, the second ledger, the third ledger, and the fourth ledger indicating the combination of the first modular vehicle component and the second modular vehicle component via the third modular vehicle component.

6. The system of claim 5, wherein providing the instruction to combine the first modular vehicle component and the second modular vehicle component via the third modular vehicle component to form the full modular vehicle is further based on a determination that the first modular vehicle component, the second modular vehicle component, and the third modular vehicle component are all available for use.

7. A method, comprising:
generating, by a modular vehicle, information regarding an interaction between at least two of a first node, a second node, and a third node, wherein the first node is a first modular vehicle component, the second node is a second modular vehicle component, and the third node is a third modular vehicle component;
receiving, at a first ledger associated with the first node, the information regarding the interaction between the at least two of the first node, the second node, and the third node;
receiving, at a second ledger associated with the second node, the information regarding the interaction between the at least two of the first node, the second node, and the third node;
receiving, at a third ledger associated with the third node, the information regarding the interaction between the at least two of the first node, the second node, and the third node; and
receiving, at a fourth ledger associated with a fourth node, the information regarding the interaction between the at least two of the first node, the second node, and the third node,
wherein the first modular vehicle component is a top portion of the modular vehicle, the second modular vehicle component is a base of the modular vehicle, the third modular vehicle component is an interface of the modular vehicle configured to mechanically and/or electrically connect the top portion of the modular vehicle with the base of the modular vehicle, and the fourth node is a fleet manager device for a fleet of modular vehicles,
wherein the first ledger, the second ledger, the third ledger, and the fourth ledger include a set of the same information, and
wherein the first node, the second node, the third node, and the fourth node are nodes on a distributed ledger network.

8. The method of claim 7, wherein the distributed ledger network is a blockchain network.

9. The method of claim 7, wherein the interaction between the at least two of the first node, the second node, and the third node includes combining the first modular vehicle component with the second modular vehicle component via the third modular vehicle component to form a full modular vehicle.

10. The method of claim 7, further comprising:
receiving, at a fifth ledger associated with a fifth node of the distributed ledger network, information regarding a failed interaction between the fifth node and a sixth node of the distributed ledger network, wherein the fifth node is a fourth modular vehicle component and the sixth node is a fifth modular vehicle component, and wherein the failed interaction includes an incompatibility between the fourth modular vehicle component and the fifth modular vehicle component.

11. The method of claim 7, further comprising:
receiving a request to form a full modular vehicle;
determining, using at least one of: the first ledger, the second ledger, the third ledger, or the fourth ledger, that the first modular vehicle component, the second modular vehicle component, and the third modular vehicle component are compatible with each other;
providing, based on the determination that the first modular vehicle component, the second modular vehicle component, and the third modular vehicle component are compatible with each other, an instruction to combine the first modular vehicle component and the second modular vehicle component via the third modular vehicle component to form the full modular vehicle; and
storing an entry on the first ledger, the second ledger, the third ledger, and the fourth ledger indicating the combination of the first modular vehicle component and the second modular vehicle component via the third modular vehicle component.

12. The method of claim 11, wherein providing the instruction to combine the first modular vehicle component and the second modular vehicle component via the third modular vehicle component to form the full modular vehicle is further based on a determination that the first modular vehicle component, the second modular vehicle component, and the third modular vehicle component are all available for use.

13. A non-transitory computer readable medium including computer-executable instructions stored thereon, which, when executed by one or more processors of a wireless access point, cause the one or more processors to perform operations of:
generating, by a modular vehicle, information regarding an interaction between at least two of a first node, a second node, and a third node, wherein the first node is a first modular vehicle component, the second node is a second modular vehicle component, and the third node is a third modular vehicle component;
receiving, at a first ledger associated with the first node, the information regarding the interaction between at least two of the first node, the second node, and the third node;
receiving, at a second ledger associated with the second node, the information regarding the interaction between the at least two of the first node, the second node, and the third node;
receiving, at a third ledger associated with the third node, the information regarding the interaction between the at least two of the first node, the second node, and the third node; and
receiving, at a fourth ledger associated with a fourth node, the information regarding the interaction between the at least two of the first node, the second node, and the third node,
wherein the first modular vehicle component is a top portion of the modular vehicle, the second modular vehicle component is a base of the modular vehicle, the third modular vehicle component is an interface of the modular vehicle configured to mechanically and/or electrically connect the top portion of the modular vehicle with the base of the modular vehicle, and the fourth node is a fleet manager device for a fleet of modular vehicles,
wherein the first ledger, the second ledger, the third ledger, and the fourth ledger include a set of the same information, and
wherein the first node, the second node, the third node, and the fourth node are nodes on a distributed ledger network.

14. The non-transitory computer readable medium of claim 13, wherein the interaction between the at least two of the first node, the second node, and the third node includes combining the first modular vehicle component with the second modular vehicle component via the third modular vehicle component to form a full modular vehicle.

15. The non-transitory computer readable medium of claim 13, wherein the computer-executable instructions stored thereon, when executed by the one or more processors of the wireless access point, further cause the one or more processors to perform operations of:
receiving, at a fifth ledger associated with a fifth node of the distributed ledger network, information regarding a failed interaction between the fifth node and a sixth node of the distributed ledger network, wherein the fifth node is a fourth modular vehicle component and the sixth node is a fifth modular vehicle component, and wherein the failed interaction includes an incompatibility between the fourth modular vehicle component and the fifth modular vehicle component.

16. The non-transitory computer readable medium of claim 13, wherein the computer-executable instructions stored thereon, when executed by the one or more processors of the wireless access point, further cause the one or more processors to perform operations of:
receiving a request to form a full modular vehicle;
determining, using at least one of: the first ledger, the second ledger, the third ledger, or the fourth ledger, that the first modular vehicle component, the second modular vehicle component, and the third modular vehicle component are compatible with each other;
providing, based on the determination that the first modular vehicle component, the second modular vehicle component, and the third modular vehicle component are compatible with each other, an instruction to combine the first modular vehicle component and the second modular vehicle component via the third modular vehicle component to form the full modular vehicle; and
storing an entry on the first ledger, the second ledger, the third ledger, and the fourth ledger indicating the combination of the first modular vehicle component and the second modular vehicle component via the third modular vehicle component.

17. The non-transitory computer readable medium of claim 16, wherein providing the instruction to combine the first modular vehicle component and the second modular vehicle component via the third modular vehicle component to form the full modular vehicle is further based on a determination that the first modular vehicle component, the second modular vehicle component, and the third modular vehicle component are all available for use.

\* \* \* \* \*